United States Patent [19]

Giuliani

[11] 4,069,135
[45] Jan. 17, 1978

[54] HYDROGEN-PRODUCING HYDROCARBON CONVERSION WITH GRAVITY-FLOWING CATALYST PARTICLES

[75] Inventor: Chester J. Giuliani, Schaumburg, Ill.
[73] Assignee: UOP Inc., Des Plaines, Ill.
[21] Appl. No.: 735,705
[22] Filed: Oct. 26, 1976
[51] Int. Cl.$^2$ .................... C10G 35/12; C10G 39/00
[52] U.S. Cl. .................................. 208/65; 208/165; 208/169
[58] Field of Search .................. 208/64, 65, 165, 169

[56] References Cited

U.S. PATENT DOCUMENTS

| | | | |
|---|---|---|---|
| 2,285,727 | 6/1942 | Komarewsky | 208/64 |
| 2,689,821 | 9/1954 | Imhoff et al. | 208/64 |
| 2,766,185 | 10/1956 | Pansing | 208/64 |
| 3,483,740 | 10/1974 | Mitchell et al. | 208/64 |
| 3,516,924 | 6/1970 | Forbes | 208/65 |
| 3,706,536 | 12/1972 | Greenwood et al. | 208/175 |
| 3,882,015 | 5/1975 | Carson | 208/165 |

*Primary Examiner*—Herbert Levine
*Attorney, Agent, or Firm*—James R. Hoatson, jr.; Robert W. Erickson; William H. Page, II

[57] ABSTRACT

A multiple-stage catalytic conversion system in which a hydrocarbonaceous charge stock is reacted in a plurality of catalytic reaction zones, through all of which the catalyst particles flow downwardly via gravity-flow. The charge stock, in the absence of added, or recycled hydrogen, is reacted in the last reaction zone, from which deactivated catalyst particles are withdrawn for regeneration. The reaction product effluent emanating therefrom is further reacted in an intermediate reaction zone. Additional reaction of the product effluent, from the intermediate zone, is effected in the first reaction zone, through which fresh, or regenerated catalyst particles are introduced into the system. The effluent from the first reaction zone is separated to recover the intended product. The system may comprise three or more reaction zones in side-by-side relationship, with the catalyst particles being transported from the lower end of one zone to the upper end of the next succeeding reaction zone. The reaction zones may assume a stacked configuration, sharing a common vertical axis, with the catalyst particles being movable from one zone to the next zone via gravity-flow.

10 Claims, 1 Drawing Figure

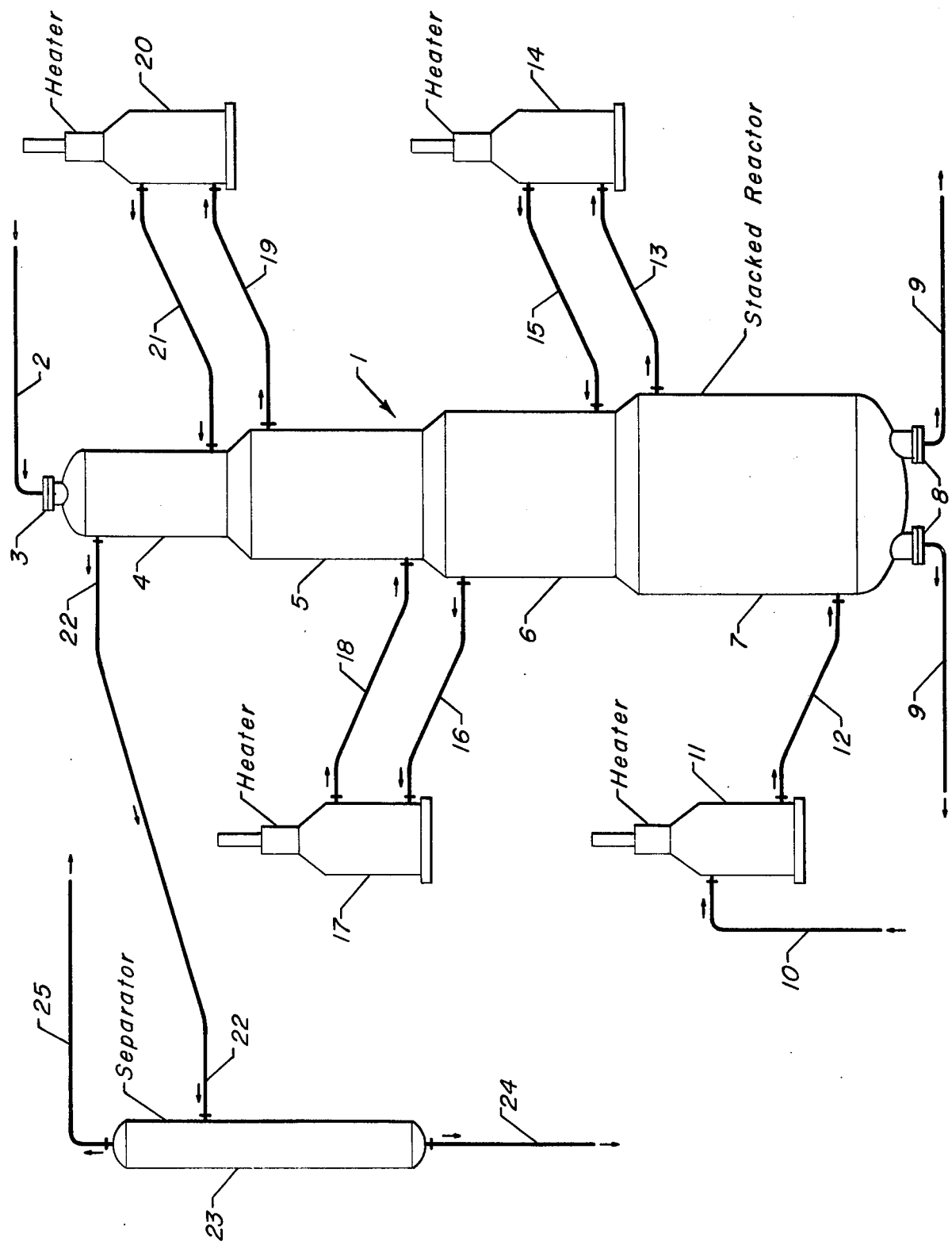

HYDROGEN-PRODUCING HYDROCARBON CONVERSION WITH GRAVITY-FLOWING CATALYST PARTICLES

APPLICABILITY OF INVENTION

The present invention is directed toward an improved technique for effecting the catalytic conversion of a hydrocarbonaceous reactant stream in a multiple-stage reaction system wherein (1) the reactant stream flows serially through the plurality of reaction zones and, (2) the catalyst particles are movable through each reaction zone via gravity-flow. More particularly, the described process technique is intended for utilization in vapor-phase systems wherein (1) the conversion reactions are principally hydrogen-producing, or endothermic, (2) fresh, or regenerated catalyst particles are introduced in the system through the upper end of the first reaction zone and, (3) deactivated catalyst particles are withdrawn from the lower end of the last reaction zone.

Various types of multiple-stage reaction systems have found widespread utilization throughout the petroleum and petrochemical industries for effecting multitudinous reactions, especially hydrocarbon conversion reactions. Such reactions are either exothermic, or endothermic, and both hydrogen-producing and hydrogen-consuming. Multiple-stage reaction systems are generally of two types: (1) side-by-side configuration with intermediate heating between the reaction zones, wherein the reactant stream of mixture flows serially from one zone to another; and, (2) a stacked design wherein a single reaction chamber, or more, contains the multiple catalytic contact stages. Such systems, as applied to petroleum refining, have been employed to effect numerous hydrocarbon conversion reactions including those which are prevalent in catalytic reforming, alkylation, ethylbenzene dehydrogenation to produce styrene, other dehydrogenation processes, etc. My invention is specifically intended for utilization in endothermic, or hydrogen-producing hydrocarbon conversion processes, in the reaction zones of which the catalyst particles are downwardly movable via gravity-flow. Thus, it is contemplated that the technique encompassed by my inventive concept is adaptable where (1) at least three reaction zones exist in side-by-side relationship with each other and, (2) at least three reaction zones exist as a stack having a common vertical axis. In the first configuration, fresh, or regenerated catalyst particles are introduced into the upper end of the first reaction zone, transported therefrom to the upper end of the intermediate reaction zone and therefrom to the upper end of the last reaction zone in the serial system. Deactivated catalyst particles are withdrawn from the lower end of the last reaction zone for subsequent regeneration. With respect to the second configuration, the fresh, or regenerated catalyst particles are introduced into the uppermost zone, flow downwardly therethrough and into the intermediate reaction zone. The deactivated catalyst particles are withdrawn from the lowermost zone for subsequent regeneration. My invention is also intended to be applicable to those reaction systems wherein the catalyst is disposed as an annular bed and the flow of the reactant stream, serially from one zone to another, is perpendicular, or radial to the movement of catalyst particles.

A radial-flow reaction system generally consists of tubular-form sections, of varying nominal cross-sectional areas, vertically and coaxially-disposed to form the reaction vessel. Briefly, the system comprises a reaction chamber containing a coaxially-disposed catalyst-retaining screen, having a nominal, internal cross-sectional area less than said chamber, and a perforated centerpipe having a nominal, internal cross-sectional area less than the catalyst-retaining screen. The reactant stream is introduced in vapor-phase, into the annular-form space created between the inside wall of the chamber and the outside surface of the catalyst-retaining screen. The latter forms an annular-form, catalyst-holding zone with the outside surface of the perforated centerpipe; vaporous reactant flows laterally and radially through the screen and catalyst zone into the centerpipe and out of the reaction chamber. Although the tubular-form configuration of the various reactor components may take any suitable shape — i.e. triangular, square, oblong, diamond, etc. — many design, fabrication and technical considerations indicate the advantages of using components which are substantially circular in cross-section.

Illustrative of a multiple-stage stacked reactor system, to which the present invention is particularly adaptable, is that shown in U.S. Pat. No. 3,706,536 (Cl. 23-288G), issued Dec. 19, 1972. As indicated, the transfer of the gravity-flowing catalyst particles from one reaction zone to another, as well as the introduction of fresh catalyst particles and withdrawal of "spent" catalyst particles, is effected through the utilization of a plurality of catalyst-transfer conduits. Briefly, my inventive concept encompasses a process wherein the fresh feed charge stock, without added, or recycle hydrogen, initially contacts the catalyst particles which have attained the highest degree of deactivation, or those which are flowing downwardly through the bottom reaction zone ultimately to be withdrawn therefrom for subsequent regeneration. The primary advantage stems from the elimination of the compressor otherwise required to recycle the hydrogen-rich vaporous phase which is combined with the fresh feed charge stock. Another major benefit, as hereinafter set forth, resides in the concomitant reduction in the size of the catalyst regeneration facilities.

OBJECTS AND EMBODIMENTS

A principal object of my invention is to eliminate compressive recycle of hydrogen in a multiple-stage, hydrogen-producing hydrocarbon conversion process. A corollary objective is to afford significant utilities savings (energy) in hydrocarbon conversion processes wherein large quantities of hydrogen are normally being circulated.

A specific object of the present invention is directed toward an improvement in the catalytic reforming of hydrocarbons in a multiple-stage reaction zone system through which catalyst particles are movable via gravity-flow, without added, or recycled hydrogen. Another object is directed toward a reduction in the size of the regeneration facilities integrated into the multiple-stage reaction system, which facilities also function with gravity-flowing catalyst particles.

In one embodiment, therefore, the present invention is directed toward a process for the catalytic reforming of a hydrocarbon charge stock in a multiple-stage system in which (1 ) catalyst particles flow downwardly, via gravity, through each reaction zone in said system, (2) catalyst particles from one reaction zone are introduced into the next succeeding reaction zone, (3) deactivated catalyst particles are withdrawn from said system through the lower end of the last reaction zone and, (4) fresh, or regenerated catalyst particles are introduced into the upper end of the first reaction zone, which process comprises the sequential steps of: (a) reacting said charge stock, in the absence of added hydrogen, in said last reaction zone, from which deactivated catalyst particles are withdrawn from said system, at catalytic reforming conditions; (b) further reacting the effluent from said last reaction zone in at least one intermediate reaction zone, at catalytic reforming conditions; (c) further reacting the effluent from said intermediate reaction zone in said first reaction zone, through which fresh or regenerated catalyst particles are introduced into said system, at catalytic reforming conditions; and, (d) recovering a normally liquid, catalytically-reforming product from the effluent withdrawn from said first reaction zone.

In a more specific embodiment, my invention encompasses a multiple-stage hydrocarbon catalytic reforming process which comprises the steps of: (a) introducing fresh, or regenerated catalyst particles into the upper end of a first reaction zone, through which said particles are movable via gravity-flow, and transferring catalyst particles from the lower end of said first zone into the upper end of a second reaction zone, through which said catalyst particles are movable via gravity-flow; (b) transferring catalyst particles from the lower end of said second reaction zone, and introducing them into the upper end of a third reaction zone, through which catalyst particles are movable via gravity-flow; (c) transferring catalyst particles from the lower end of said third reaction zone and introducing them into the upper end of a fourth reaction zone, through which catalyst particles are movable via gravity-flow, and withdrawing deactivated catalyst particles from the lower end of said fourth zone; (d) reacting a hydrocarbon charge stock, in the absence of added hydrogen, in said fourth reaction zone, at catalytic reforming conditions; (e) further reacting the resulting fourth reaction zone effluent in said third reaction zone at catalytic reforming conditions; (f) further reacting the resulting third reaction zone effluent in said second reaction zone at catalytic reforming conditions; (g) further reacting the resulting second reaction zone effluent in said first reaction zone at catalytic reforming conditions; and, (h) recovering a normally liquid, catalytically-reformed product from the resulting first reaction zone effluent.

These, as well as other objects and embodiments will become evident from the following, more detailed description of the present hydrocarbon conversion process. In one such other embodiment, four individual reaction zones are stacked, and the first reaction zone contains about 5.0% to about 15.0% by volume of the total catalyst, the second reaction zone from about 15.0% to about 25.0%, the third reaction zone from about 25.0% to about 35.0% and the fourth reaction zone from about 35.0% to about 50.0%.

PRIOR ART

Candor compels recognition of the fact that various types of hydrocarbon conversion processes make use of multiple-stage reaction systems, either in side-by-side configuration, as a vertically-disposed stack, or a combination of a stacked system in side-by-side relation with one or more separate reaction zones. As applied to petroleum refining, such systems may be employed in a wide variety of hydrocarbon conversion reactions.

While my inventive concept is adaptable to many conversion reactions and processes, through the reaction system of which the catalyst particles are movable via gravity-flow, the same will be additionally described in conjunction with the well-known endothermic, or hydrogen-producing catalytic reforming process. Historically, catalytic reforming has been effected in a non-regenerative, fixed-bed system comprising a plurality of reaction zones in side-by-side relation. When the catalytic composite had become deactivated to the extent that continuous operation was no longer economically feasible, the entire unit was shut-down and the catalyst regenerated in situ. Of more recent vintage is the so-called "swing bed" system in which an extra reactor is substituted for one which is due to be placed off-stream for regeneration purposes. Still more recently, multiple-stage reactor systems have been provided in which the catalyst particles flow, via gravity, through each reaction zone. In a "stacked" system the catalyst particles also flow downwardly from one catalyst-containing zone to another, and ultimately transfer to a suitable regeneration system also preferably functioning with a downwardly moving bed of catalyst particles. In effect, the catalyst particles are maintained from one section to another in a manner such that the flow of catalyst is continuous, at frequent intervals, or at extended intervals, with the movement being controlled by the quantity of catalyst withdrawn from the last of the series of individual reaction zones.

U.S. Pat. No. 3,470,090 (Cl. 208-138), issued Sept. 30, 1969, illustrates a multiple-stage side-by-side reaction system with intermediate heating of the reactant stream which flows serially through the individual reaction zones. Catalyst withdrawn from any one of the reaction zones is transported to suitable regeneration facilities. A system of this type can be modifiedto the extent that the catalyst particles withdrawn from a given reaction zone are transported to the next succeeding reaction zone, while that catalyst withdrawn from the last reaction zone may be transported to a suitable regeneration facility. The necessary modifications can be made in the manner disclosed in U.S. Pat. No. 3,839,197 (Cl. 208-174), issued Oct. 1, 1974, involving an inter-reactor catalyst transport method. Catalyst transfer from the last reaction zone in the plurality to the top of the catalyst regeneration zone is possible through the technique illustrated in U.S. Pat. No. 3,839,196 (Cl. 208-174), issued Oct. 1, 1974.

A stacked reactor configuration is shown in U.S. Pat. No. 3,647,680 (Cl. 208-65), issued Mar. 7, 1972, as a two-stage system having an integrated regeneration facility which receives that catalyst withdrawn from the bottom reaction zone. Similar stacked configurations are illustrated in U.S. Pat. No. 3,692,496 (Cl. 23-288G), issued Sept. 19, 1972 and U.S. Pat. No. 3,725,249 (Cl. 208-139), issued Apr. 3, 1973.

As hereinbefore stated, general details of a three reaction zone, stacked system are presented in U.S. Pat. No. 3,706,536 (cl. 23-288G), issued Dec. 19, 1972, and illustrated one type of multiple-stage system to which the present inventive concept is applicable. It should be noted, as generally practiced in a catalytic reforming unit, that each succeeding reaction zone contains a greater volume of catalyst. U.S. Pat. No. 3,864,240 (C1. 208-64), issued Feb. 4, 1975, is illustrative of the integration of a reaction system having gravity-flowing catalyst particles with a fixed-bed system. As stated in this reference, one of the advantages resides in revamping an existing three reaction zone, fixed-bed system to conform to the integrated system. In such a modification, it is suggested that a second compressor be added to permit the split-flow of hydrogen-rich recycle gas as also described in U.S. Pat. No. 3,516,924 (Cl. 208-75), issued June 23, 1970.

U.S. Pat. No. 3,725,248 (Cl. 208-138), issued Apr. 3, 1973, illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities. As illustrated, the flow of the fresh feed charge stock is countercurrent to the flow of catalyst particles from one zone to the top of the next succeeding reaction zone. Thus, the fresh feed initially contacts those catalyst particles which have experienced the greatest degree of deactivation. However, there is no recognition of the "no recycle hydrogen" concept. As stated, conventional reforming entails admixing a considerable excess of hydrogen with the hydrocarbon charge stock — e.g. up to about a mole ratio of hydrogen/hydrocarbon of 10.0:1.0.

In U.S. Pat. No. 3,364,137 (Cl. 208-139), issued Jan. 16, 1968, there is described a catalytic reforming process which can employ a substantially pure, once-through hydrogen stream which is initially admixed with the fresh charge to the first reaction zone. As an alternative, the use of a combination of recycled hydrogen with hydrogen from an external source is contemplated. In both techniques, the hydrogen is "added" to the hydrocarbon charge stock via compressive means. Furthermore, there is no recognition that the charge stock initially contacts the catalyst having attained the highest degree of deactivation.

These illustrations are believed to be fairly representative of the art which has developed in the multiple-stage processes, and especially in those conversion systems wherein catalyst particles are movable through each reaction zone via gravity-flow. It is noteworthy that there is no recognition of the present inventive concept of no "added", or "recycle" hydrogen to the first reaction zone, into which the fresh feed charge stock is initially introduced.

SUMMARY OF INVENTION

As hereinbefore set forth, the process encompassed by my inventive concept is suitable for use in hydrocarbon conversion systems characterized as multiple-stage and in which catalytic particles are movable, via gravity-flow, in each reaction zone. Furthermore, the present invention is principally intended for utilization in systems where the principal reactions are endothermic, or hydrogen-producing, and are effected in a vapor-phase operation. Although the following discussion is specifically directed toward catalytic reforming of naphtha boiling range fractions, there is no intent to so limit the present invention. Catalytic reforming, as well as many other processes, has experienced several phases of development currently terminating in a system in which the catalyst beds assume the form of a descending column in one or more reaction vessels. Typically, the catalysts are employed in spherical form having a nominal diameter ranging from about 1/32-inch to about 5/32-inch in order to offer free-flow characteristics which will neither bridge, nor block the descending column, or columns of catalyst within the overall system. In one such multiple-stage system, the reaction chambers are vertically-stacked, and a plurality, generally from about six to about sixteen, of relatively small diameter conduits are employed to transfer catalyst particles from one reaction zone to the next lower reaction zone, via gravity-flow, and ultimately as withdrawn catalyst from the last reaction zone. The latter are usually transported to the top of a catalyst regeneration facility, also functioning with a descending column of catalyst particles; regenerated catalyst is transported to the top of the upper reaction zone of the stack. In order to facilitate and enhance gravity-flow within each reaction vessel, as well as from one to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst articles from the bottom of one zone to the top of the next succeeding zone, and from the last reaction zone to the top of the regeneration facility (U.S. Pat. No. 3,839,196).

Catalytic reforming of naphtha boiling range hydrocarbons, a vapor-phase operation, is conducted at conditions which include catalyst bed temperatures in the range of about 700° F. to about 1020° F.; judicious and cautious techniques generally dictate that catalyst temperatures not substantially exceed a level of about 1020° F. Other conditions include a pressure from about 50 psig. to about 100 psig., a liquid hourly space velocity (defined as volumes of fresh charge stock per hour, per volume of total catalyst particles) of from 0.2 to about 10.0 and, prior to the present invention, a hydrogen to hydrocarbon mole ratio from about 1.0:1.0 to about 10.0:1.0, with respect to the initial reaction zone. As those possessing the requisite skill in the refining art are aware, the described continuous regenerative reforming system offers numerous advantages when compared to the prior fixed-bed systems. Among these is the capability of efficient operation at significantly lower pressures — e.g. 50 psig. to about 150 psig. — and higher liquid hourly space velocities — e.g. 3.0 to about 8.0. Further, as a result of continuous catalyst regeneration, higher consistent inlet catalyst bed temperatures can be maintained — e.g. 950° F. to about 1010° F. There also exists a corresponding increase in both hydrogen production and hydrogen purity in the vaporous phase recovered from the product separator. This highly pure hydrogen stream can be advantageously utilized to enhance the operation of one or more integrated hydrogen-consuming, hydrocarbon conversion processes.

Catalytic reforming reactions are multifarious, and include the dehydrogenation of naphthenes to aromatics, the dehydrocyclization of paraffins to aromatics, the hydrocracking of long chain paraffins into lower-boiling, normally-liquid material and, to a certain extent, the isomerization of paraffins. These reactions are effected through the use of one or more of the Group VIII noble metals — e.g. platinum, iridium, rhodium, palladium — combined with a halogen — e.g. chlorine and/or fluorine — and a porous carrier material such as alumina. Recent investigations have indicated that more advantageous results are attainable and enjoyed through the cojoint use of a catalytic modifier; these are generally selected from the group of cobalt, nickel, gallium, germanium, tin, rhenium, vanadium and certain mixtures thereof. Regardless of the particular selected catalytic composite, the ability to attain the advantages over the common fixedbed systems is greatly dependent upon achieving substantially uniform catalyst flow downwardly through the reaction system.

Catalytic reforming, as currently, conventionally practiced, is a well known process thoroughly described in the literature, having been a commercially important tool of the petroleum refining industry for more than a quarter of a century. One of the many items gleaned from the vast amount of reforming experience and resulting knowledge is the soundness of utilizing multiple stages, each of which contains a different quantity of catalyst, expressed generally as volume percent. The reactant stream, hydrogen and the hydrocarbon feed, flows serially through the reaction zones in order of increasing catalyst volume with, of course, interstage heating. In a three reaction zone system, typical catalyst loadings are: first zone, 10.0% to about 30.0%; second zone, from 20.0% to about 40.0%; and, the third zone, from about 40.0% to about 60.0%. With respect to a four reaction zone system, suitable catalyst loading would be: first, 5.0% to about 15.0%; second, 10.0% to about 20.0%; third, 20.0% to about 30.0%; and, fourth, 40.0% to about 60.0%. Unequal catalyst distribution, increasing in the serial direction of reactant stream flow, facilitates and enhances the distribution of the reactions and the overall heat of reaction. Current operating techniques involve separating the total effluent from the last reaction zone, in a high-pressure separator, at a temperature of about 60° F. to about 140° F., to provide the normally liquid product stream and a hydrogen-rich vaporous phase. A portion of the latter is combined with the fresh charge stock as recycle hydrogen, while the remainder is vented from the process, to be employed in a variety of hydrogen-consuming processes.

It has now been determined that the current, improved catalytic composites coupled with (1) a reaction zone system in which catalyst particles are movable via gravity-flow and, (2) continuous catalyst regeneration, make it possible to effect catalytic reforming without an added, or recycled hydrogen-rich gaseous stream. This permits a significant reduction in the capital expenditure of a commercial unit by completely eliminating the recycle gas compressor. When there is no recycled hydrogen, the hydrogen/hydrocarbon mole ratio is obviously "zero" at the inlet of the catalyst bed in the first reaction zone which the charge stock "sees". In catalytic reforming, most of the naphthenes are converted to aromatics in this initial reactor; this produces a large amount of hydrogen. In fact, as much as 50.0% of the overall hydrogen production from the entire catalytic reforming process stems from the reactions effected in the first reactor. This hydrogen yield provides an increasing hydrogen/hydrocarbon ratio in the second and subsequent reaction zones. This means that only reactor number one functions at zero hydrogen/hydrocarbon ratio, and only at the inlet to the catalyst bed therein. As hereinbefore stated, considering a four-reactor system, the reactant flow is serially 1-2-3-4; in a stacked system, the number one reaction zone is considered to be at the top. Also, catalyst distribution is generally unequal and such that the catalyst volume increases from one reactor to the next succeeding reactor; that is, the number one zone contains the least amount of catalyst particles, while the last, or fourth reaction zone contains more catalyst than any of the others. It is not uncommon for the fourth reaction zone to contain 50.0% of the total catalyst within the entire system.

The generally accepted and most common method of operating a gravity-flowing catalytic reforming system, with integral continuous catalyst regeneration, is to stack the reaction zones such that catalyst particles also flow from one reaction zone into the next succeeding lower reaction zone. With this type of arrangement, catalyst circulation rate is the same through all the reactors constituting the stack. Where no recycle gas compressor is provided, this becomes a relatively poor arrangement since the first (uppermost) reaction zone requires a higher catalyst circulation rate due to this high coke deposition. This reactor would then dictate the catalyst circulation rate for all the reactors in the stack. Furthermore, there is the additional disadvantage of highly coked, deactivated catalyst flowing into the second and subsequent reactors where maximum activity is required to effect paraffin isomerization, paraffin dehydrocyclization and hydrocracking.

My invention, as directed to a multiple-stage system wherein catalyst particles flow downwardly via gravity through each reaction zone, and from one zone into the next succeeding zone, is to introduce the fresh charge stock into the last (lowermost) reaction zone in which is disposed the catalyst which has attained the highest degree of deactivation. This is, obviously contrary to the prior art practice of initially contacting the charge stock with fresh, or regenerated catalyst which has the highest activity. The main benefit of this is an overall reduction in the coke make which allows the accompanying regenerator to be much smaller. Coke laydown occurs considerably slower on catalyst that has already been partially deactivated by coke than it does on the highly active freshly regenerate catalyst entering the uppermost reaction zone in the stack. The coke content of the catalyst withdrawn from this lowermost reaction zone can be permitted to exceed significantly the otherwise normal amount. Since the main purpose of this reaction zone is the conversion of naphthenes into aromatics, the fact that the catalyst therein is somewhat less active is of no concern.

The effluent from the lowermost reaction zone is increased in temperature, and introduced into the zone immediately above. This continues in countercurrent fashion ion such that the flow of the reactant stream is 4-3-2-1 as contrasted to the prior art flow of 1-2-3-4. With respect to a given reaction zone, out of a system comprising three or four, the reactant stream can be introduced into the lower end and withdrawn from the upper end, or vice versa. However, since it is desired to have the reactant stream contact catalyst in order of its increasing activity — i.e. lesser degree of deactivation — then complete countercurrent flow with respect to the downward movement of catalyst particles is preferred.

BRIEF DESCRIPTION OF DRAWING

Further description of the present invention, and the method of operation, will be made in conjunction with the accompanying drawing. It is understood that the drawing is presented solely for the purposes of illustration, and the same is not intended to be construed as limiting upon the scope and spirit of my invention as defined by the appended claims. Therefore, miscellaneous appurtenances, not required for a complete understanding of the inventive concept, have been eliminated, or reduced in number. Such items are well within the purview of one possessing the requisite skill in the appropriate art. The illustrated embodiment is presented as a simplified schematic flow diagram showing a process in which stacked reactor system 1 consists of four individual reaction zones 4, 5, 6 and 7.

DETAILED DESCRIPTION OF DRAWING

With respect to the volumetric distribution of catalyst particles in stacked reactor 1, reaction zone 4 contains about 10.0%, reaction zone 5 contains about 15.0%, reaction zone 6 contains about 25.0% and lowermost reaction zones 7 contains about 50.0%. Fresh, or regenerated catalyst particles are at least periodically introduced into reaction zone 4 through conduit 2 and catalyst inlet port 3. The catalyst circulation rate through the stacked system 1 is dependent upon the withdrawal rate from reaction zone 7 which, in turn, is primarily dependent upon the quantity of coke deposited thereon. In accordance with the present technique, catalyst particles, withdrawn by way of a plurality of outlet ports 8 and conduits 9, can be permitted a coke deposition up to about 20.0% by weight.

The fresh, or regenerated catalyst particles introduced into reaction zone 4 flow downwardly therethrough into reaction zone 5. Catalyst particles also flow through reaction zone 5 and into reaction zone 6 by way of gravity-flow. They then flow into reaction zone 7 from which they are ultimately withdrawn for subsequent regeneration. As above stated, the fact that the coke level of the catalyst withdrawn from reaction zone 7 can be as high as 20.0% by weight, results in a lower overall catalyst circulation and regeneration rate.

The catalyst particles withdrawn from reaction zone 7 will, however, possess sufficient activity to effect substantial conversion of naphthenes to aromatics and hydrogen. Therefore, the naphtha boiling range charge stock, without recycle, or added hydrogen, after suitable heat-exchange with a higher temperature stream and additional heating in heater 11, being introduced thereto via conduit 10, is passed through line 12 into the lower portion of reaction zone 7. Approximately 85.0% to about 90.0% of the virgin naphthenes are dehydrogenated to aromatics, with the concomitant production of hydrogen. Since the dehydrogenation reactions being effected in reaction zone 7 are principally endothermic, the temperature of the effluent therefrom in line 13 will be increased through the use of a reaction zone inter-heater 14. Heated effluent is then introduced into the first intermediate reaction zone 6; the effluent therefrom is introduced, via line 16, into inter-heater 17. From inter-heater 17, the heated effluent is passed into the second intermediate reaction zone 5 via conduit 18. The effluent from reaction zone 5, in line 19, is increased in temperature in inter-heater 20, and introduced by way of line 21 into uppermost reaction zone 4, into which regenerated, or fresh catalyst particles are introduced via conduit 2. Product effluent is withdrawn from reaction zone 4 through line 22 and, following its use as a heat-exchange medium, introduced thereby into a suitable condenser (not illustrated) wherein the temperature is further decreased to a level in the range of about 60° F. to about 140° F. The condensed material is transferred into high-pressure separator 23, wherein separation into a normally liquid phase, line 24, and a hydrogen-rich vaporous phase, line 25, is effected.

Through the implementation of the present invention, as above described, the catalytic reforming of a hydrocarbon charge stock is effected in a multiple-stage system, in which catalyst particles flow downwardly, via gravity, through each reaction zone, without the recycling of a portion of the hydrogen-rich vaporous separated from the desired normally liquid product effluent. Furthermore, it will be noted that no hydrogen from an external source has been added to the fresh charge stock on a once-through basis. As will be recognized by those skilled in the art, there is afforded a significant capital savings as a result of eliminating the recycle gas compressor, in addition to a concomitant savings in operational utility requirements.

I claim as my invention:

1. A process for the catalytic reforming of a naphtha charge stock with a catalyst comprising a Group VIII noble metal or an alumina carrier to produce a gasoline fraction of higher octane number in a multiple-stage system in which (1) catalyst particles flow downwardly, via gravity, through each reaction zone in said system, (2) catalyst particles from one reaction zone are introduced into the next succeeding reaction zone, (3) deactivated catalyst particles are withdrawn from said system through the lower end of the last reaction zone and, (4) fresh, or regenerated catalyst particles are introduced into the upper end of the first reaction zone, which process comprises the sequential steps of:
    a. reacting said charge stock, in the absence of added or recycled hydrogen, in said last reaction zone, from which deactivated catalyst particles are withdrawn from said system, at catalytic reforming conditions;
    b. further reacting the effluent from said last reaction zone in at least one intermediate reaction zone, at catalytic reforming conditions;
    c. further reacting the effluent from said intermediate reaction zone in said first reaction zone, through which fresh or regenerated catalyst particles are introduced into said system, at catalytic reforming conditions; and,
    d. recovering a normally liquid, catalytically-reformed product from the effluent withdrawn from said first reaction zone.

2. The process of claim 1 further characterized in that said multiple-stage system comprises at least three reaction zones.

3. The process of claim 1 further characterized in that the reaction zones in said system are in side-by-side configuration, and the catalyst particles are transported from the lower end of one reaction zone to the upper end of the next succeeding reaction zone.

4. The process of claim 1 further characterized in that the reaction zones in said system are stacked, along a common vertical axis, and the catalyst particles flow via gravity from one reaction zone to the next succeeding reaction zone.

5. The process of claim 1 further characterized in that said last reaction zone contains the greater amount of catalyst particles.

6. The process of claim 1 further characterized in that said multiple-stage system contains four reaction zones.

7. A multiple stage catalytic reforming of a naphtha charge stock with a catalyst comprising a Group VIII noble metal on an alumina carrier to produce a gasoline fraction of higher octane number than said naphtha which comprises the steps of:
    a. introducing fresh, or regenerated catalyst particles into the upper end of a first reaction zone, through which said particles are movable via gravity-flow, and transferring catalyst particles from the lower end of said first zone into the upper end of a second reaction zone, through which said catalyst particles are movable via gravity-flow;

b. transferring catalyst particles from the lower end of said second reaction zone, and introducing them into the upper end of a third reaction zone, through which catalyst particles are movable via gravity-flow;

c. transferring catalyst particles from the lower end of said third reaction zone and introducing them into the upper end of a fourth reaction zone, through which catalyst particles are movable via gravity-flow, and withdrawing deactivated catalyst particles from the lower end of said fourth zone;

d. reacting a hydrocarbon charge stock, in the absence of added or recycled hydrogen, in said fourth reaction zone, at catalytic reforming conditions;

e. further reacting the resulting fourth reaction zone effluent in said third reaction zone at catalytic reforming conditions;

f. further reacting the resulting third reaction zone effluent in said second reaction zone at catalytic reforming conditions;

g. further reacting the resulting second reaction zone effluent in said first reaction zone at catalytic reforming conditions; and, h. recovering a normally liquid, catalytically-reformed product from the resulting first reaction zone effluent.

8. The process of claim 7 further characterized in that said four reaction zones are disposed in side-by-side relationship, and said catalyst particles are transported from the lower end of one reaction zone to the upper end of the next succeeding reaction zone.

9. The process of claim 7 further characterized in that said four reaction zones are stacked, having a common vertical axis, and said catalyst particles are movable from one reaction zone to the next succeeding reaction zone via gravity-flow.

10. The process of claim 7 further characterized in that said first reaction zone contains about 5.0% to about 15.0% by volume of the total catalyst, said second reaction zone from about 15.0% to about 25.0%, said third reaction zone from about 25.0% to about 35.0% and said fourth reaction zone from about 35.0% to about 50.0%.

* * * * *